(12) United States Patent
Markiewicz et al.

(10) Patent No.: US 8,064,702 B2
(45) Date of Patent: Nov. 22, 2011

(54) HANDWRITING TEMPLATES

(75) Inventors: Jan-Kristian Markiewicz, Redmond, WA (US); Adrian James Garside, Sammamish, WA (US); Krishna Kotipali, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1004 days.

(21) Appl. No.: 11/962,428

(22) Filed: Dec. 21, 2007

(65) Prior Publication Data

US 2009/0161959 A1 Jun. 25, 2009

(51) Int. Cl.
*G06K 9/00* (2006.01)

(52) U.S. Cl. ........ 382/187; 345/179; 345/467; 715/224; 715/256; 715/268

(58) Field of Classification Search ........... 382/187–189
See application file for complete search history.

(56) References Cited

U.S. PATENT DOCUMENTS

| | | | |
|---|---|---|---|
| 5,655,136 A | 8/1997 | Morgan | |
| 5,710,831 A | 1/1998 | Beernink et al. | |
| 5,991,441 A | 11/1999 | Jourjine | |
| 6,088,481 A | 7/2000 | Okamoto et al. | |
| 6,340,967 B1 | 1/2002 | Maxted | |
| 6,791,537 B1 | 9/2004 | Shim | |
| 6,989,822 B2 | 1/2006 | Pettiross | |
| 7,158,678 B2 | 1/2007 | Nagel | |
| 7,174,042 B1 | 2/2007 | Simmons | |
| 7,215,815 B2 | 5/2007 | Honda | |
| 7,259,752 B1 | 8/2007 | Simmons | |
| 7,277,089 B2 | 10/2007 | Keely | |
| 2003/0028851 A1 | 2/2003 | Leung et al. | |
| 2003/0191729 A1* | 10/2003 | Siak et al. | 706/45 |
| 2004/0008222 A1 | 1/2004 | Hovatter et al. | |
| 2004/0093568 A1 | 5/2004 | Lerner et al. | |
| 2005/0099407 A1* | 5/2005 | Pennington et al. | 345/179 |
| 2005/0190973 A1 | 9/2005 | Kristensson et al. | |
| 2006/0007189 A1 | 1/2006 | Gaines et al. | |
| 2006/0033719 A1 | 2/2006 | Leung et al. | |
| 2006/0230350 A1 | 10/2006 | Baluja | |
| 2006/0253777 A1 | 11/2006 | Yalovsky | |
| 2007/0022370 A1 | 1/2007 | Lagardere et al. | |
| 2007/0140561 A1 | 6/2007 | Abdulkader et al. | |

OTHER PUBLICATIONS

"Active Ink Software," the White Paper, Last revision Sep. 4, 2003 (Active Ink).*
CalliGrapher 8.5 User's Guide, http://www.phatware.com/doc/CalliGrapher8/UserGuide.pdf.
Online Handwriting Recognition Technology and Its Applications, http://www.fujitsu.com/downloads/MAG/vol40-1/paper23.pdf.
Vision Objects Leading provider of Handwriting Recognition Technology, http://www.visionobjects.com/telechar/Factsheet_Vision_Objects_(English_Version)--16-en.pdf.
LipiTk: A Generic Toolkit for Online Handwriting Recognition, http://lipitk.sourceforge.net/docs/LipiTk_IWFHR10_Final.pdf.

(Continued)

*Primary Examiner* — Anand Bhatnagar
*Assistant Examiner* — Michael Vanchy, Jr.
(74) *Attorney, Agent, or Firm* — Shook, Hardy & Bacon L.L.P.

(57) ABSTRACT

Apparatuses, methods, and computer-storage media provide character string templates to facilitate receiving non-prose handwriting input from a user and converting that input to text to create character strings capable of being provided to application and/or displayed to the user. Templates may be provided manually or automatically, and may or may not be associated with an application text box. A template generally contains pre-populated segments and open segments for receiving handwriting.

20 Claims, 5 Drawing Sheets

OTHER PUBLICATIONS

Active Ink Software, http://activeinksoftware.com/documents/ActiveInkSoftwareWhitePaper.pdf.

A Prototype User Interface for a Mobile Multimedia Terminal1, http://bwrc.eecs.berkeley.edu/Publications/1995/ui_for_mobile_multimedia.chi95/prototype-ui-for-mm-terminal.pdf.

An Automatic Configuration System for Handwriting Recognition Problems, http://www.springerlink.com/content/2fkjju277u9t7b5t/fulltext.pdf.

Electronic Document & Records Management Modules, http://www.idoxplc.com/iii/doc/IDOX%20Software:%20Electronic%20Document%20&%20Records%20Management%20Brochure.pdf;jsessionid=AC386C1A75EC17B35E2F71D6DC1BC88E?extension=.pdf&wmTransparency=0&id=3913091&wmLocation=0&location=Volume3&contentType=application%2Fpdf&wmName=&pageCount=1.

* cited by examiner

HANDWRITING TEMPLATES

BACKGROUND

Pen-based computing systems, such as tablet PCs, are becoming quite popular. The technology that drives these systems has matured significantly over recent years, which has added to the popularity of these systems. This technology has several advantages over the traditional keyboard and mouse, such as the convenience of one-handed operation, direct manipulation and naturalness of handwriting. Pen-based technology capitalizes on these advantages and strives to make the pen text input experience at least as pleasant as it is with a keyboard and mouse. Although handwriting recognizers have come a long way to perform well for prose text and have had some success related to filling out electronic forms, there are deficiencies in the technology as it relates to non-prose text entry.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to allowing a user to easily and efficiently enter non-prose handwriting input by providing the user with character string templates. The templates are configured to receive handwriting input in open segments and convert it to text, which is combined with pre-populated text segments to create a character string. Character strings generated by templates as in various embodiments of the present invention may be displayed to the user and/or used by applications.

Further embodiments of the present invention allow a user to manually select areas on a user interface in which to provide templates. Users may find this helpful, for example, when inserting e-mail addresses, URLs or other types of character strings in the body of letters, e-mails, instant messages, or other documents. Embodiments of the invention also relate to automatically selecting and providing templates in response to particular actions taken by a user.

According to an embodiment of the invention, the open segments in the templates may expand to accommodate any amount of handwriting input the user wishes to enter, and may shrink after the user has ceased entering input to accommodate only the text generated by converting the handwriting input.

In still further embodiments of the invention, the templates may include pre-populated segments accompanied by alternatives from which a user may select as desired. In some embodiments, the user may be able to enter new alternatives for pre-populated segments.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

Figure 1:
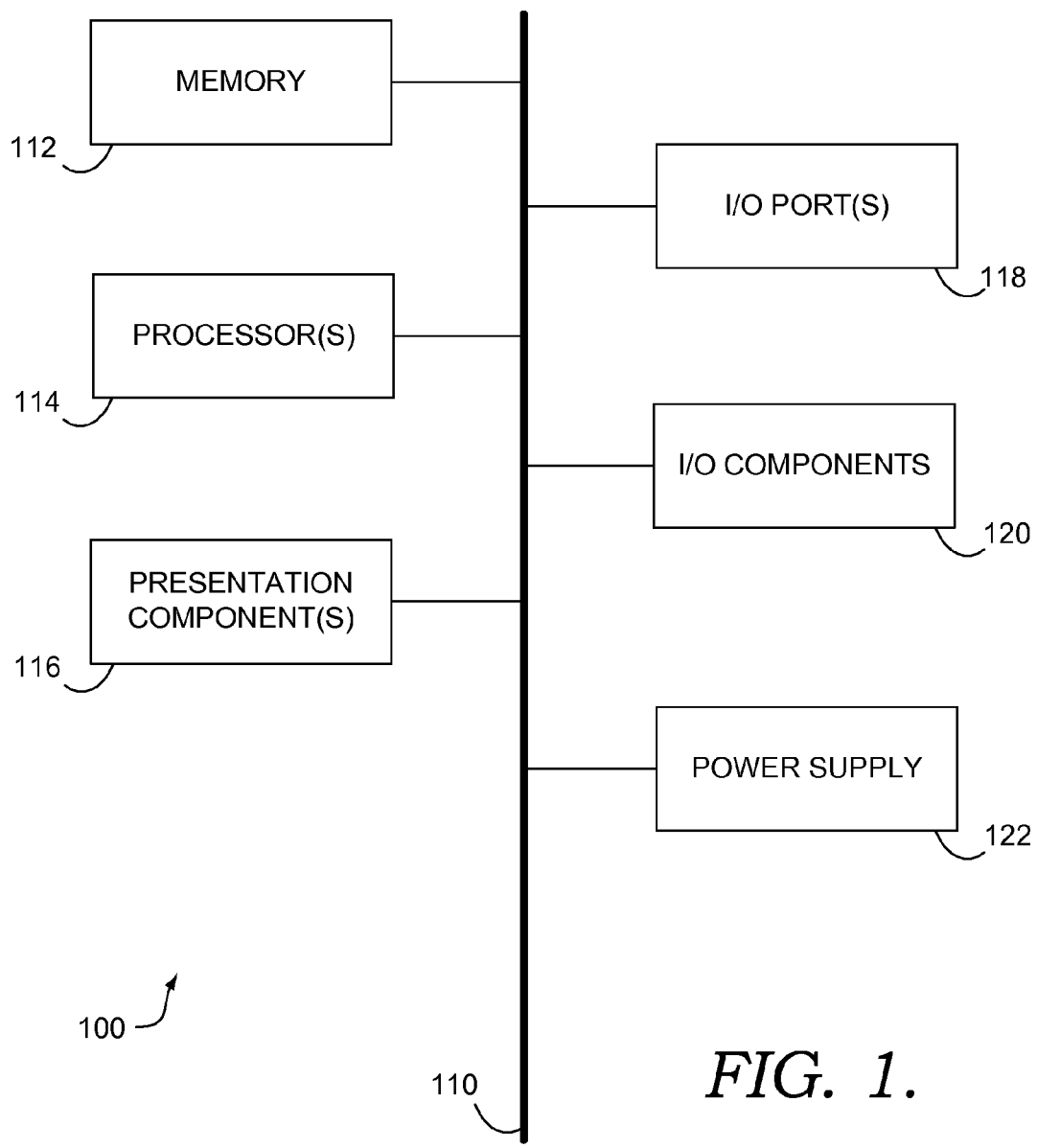
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed toward providing character string templates for facilitating processing non-prose handwriting input from a computer user. In accordance with embodiments of the present invention, a character string template may be provided that includes at least one open segment for receiving handwriting input and at least one pre-populated segment. Handwriting input may be received in the open segment, and the input may be converted to text. A resulting character string that includes the converted text and pre-populated segment may be displayed and/or provided to an application text box.

Embodiments of the present invention are directed toward methods that include providing a template for creating a character string. The template may include at least one open segment for receiving handwriting input in and at least one pre-populated text segment. Handwriting input is received in the open segment and is converted to text to generate the character string, which includes the at least one pre-populated text segment and the text. Finally, the character string is displayed.

Further embodiments of the present invention are directed toward methods that include automatically selecting at least one template for receiving handwriting input in response to a user setting focus on an application text box. The template includes at least one open segment for receiving handwriting input and at least on pre-populated text segment. The template is automatically provided, and handwriting input is received in the open segment. The handwriting input is then converted to text to generate a character string that includes the text and the pre-populated text segment. The character string is then provided to the application text box.

Still further embodiments of the present invention are directed toward an apparatus that include a computing system having a display. The computing system is operable to provide at least one template for creating a character string, wherein the at least one template comprises at least one pre-populated text segment and at least one open segment for receiving handwriting input. The computing system is further operable to receive handwriting input into the open segment, convert that handwriting input to text to generate a character string, wherein the character string includes the text and the pre-populated text segment, and display the character string.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, or a mouse. A pen digitizer and an accompanying pen or stylus may be provided in order to digitally capture freehand input (e.g. electronic ink). The pen digitizer may be connected to a serial port interface, directly to the processor 114, or it may be coupled to the processor 114 in any suitable manner, such as via a parallel port or another interface and the system bus 110 as is known in the art. Furthermore, the usable input area of the digitizer may be integrated in a monitor or similar presentation component 116, or it may exist as a separate device overlaying or otherwise appended to a monitor or similar presentation component 116. Using a stylus, a user can select, highlight, and write on a digitizing display area. Examples of suitable digitizing display panels include electromagnetic pen digitizers and optical digitizers. Other types of pen digitizers may also be used. The digitizer, in connection with the computing system interprets gestures made using the stylus in order to manipulate data, enter text, and execute conventional computer application tasks, such as creating, editing, and modifying spreadsheets, word processing programs, and the like.

The stylus may be equipped with buttons or other features to augment its capabilities. In one example, a stylus could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used in the system of FIG. 1. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). As still further examples, systems may use ".NET" or DCOM (distributed component object model) as additional implementations of the ink platform. Yet further implementations may be used including the Win32 programming model and the .Net programming model form Microsoft Corporation. These platforms are commercially available and known in the art.

In addition to use with full performance pen-based computing systems or "tablet PCs" (e.g. convertible laptops or "slate" type tablet PCs), aspects of this invention can be used in conjunction with other types of pen-based computing systems and/or other devices that accept and/or display data as electronic ink and/or accept and/or display electronic pen or stylus input, such as: hand-held or palm-top computing systems; personal digital assistants; pocket personal computers; mobile and cellular telephones, pagers, and other communications devices; watches; appliances; and any other devices or systems that include a monitor or other display device and/or digitizer that presents printed or graphical information to users and/or allows input using an electronic pen or stylus.

As previously mentioned, in one embodiment, the present invention relates to providing a character string template for receiving non-prose handwriting input to a computing system. In another embodiment, the present invention relates to automatically providing, in response to a user action, a character string template for receiving handwriting input to generate a character string to be used by an application. Embodiments of the present invention also relate to automatically determining the nature of a portion of text selected by a user and to providing an appropriate template for the selected text.

Figure 2:
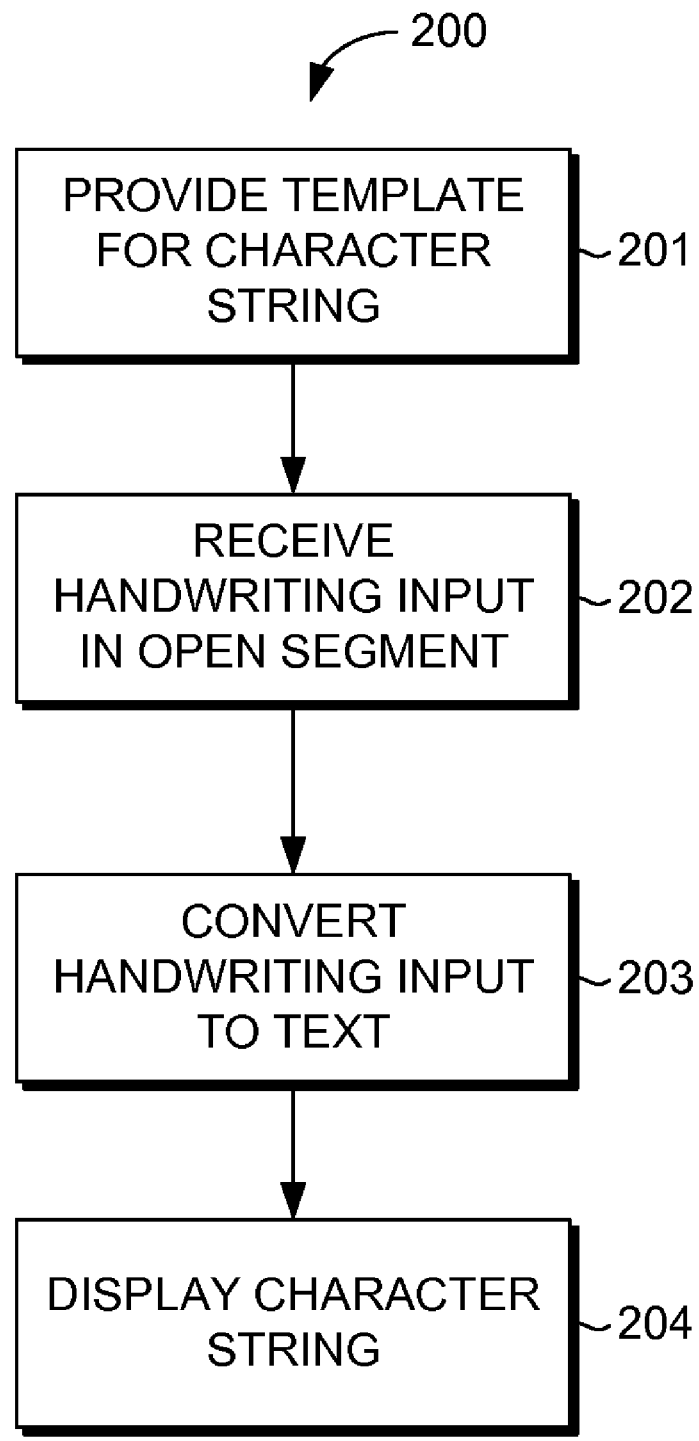
FIG. 2 is a flow diagram showing a method for creating a character string using a template in accordance with an embodiment of the present invention.

Turning to FIG. 2, a flow diagram is illustrated which shows a method 200 for using a template to facilitate processing of non-prose handwriting input from a computer user to generate a character string. Initially, as shown in block 201, a template for creating a character string is presented to the user. In an embodiment, the template is provided automatically, as discussed below in connection with FIG. 3. In another embodiment, the template may be invoked by the user by utilizing some defined operation with a user input device to indicate the user's desire that a template appear in a location selected by the user. As will be readily recognized by one skilled in the art, a character string may comprise an uninterrupted series of characters. The character string may be of a form readily recognizable by any number of computer applications generally known in the art, and may be operable to provide any manner of functionality within a program.

For example, a character string may be a Uniform Resource Locator (URL), operable to direct an internet browser to retrieve a particular web page associated with the URL. Other examples of character strings contemplated by the invention may include e-mail addresses or filenames. It will be readily appreciated by one skilled in the art that character strings such as these may generally be comprised, for example, of a series of alpha-numeric characters separated at various points by special characters such as "/" "\" "." or "@". Examples of character strings as embodied herein may be of the format, for example, http://www.AAAAA.com, filename/foldername/othername.doc, or johndoe@email.com.

The alpha-numeric characters may be alphabetic characters or numeric characters. Examples of alphabetic characters generally known in the art include computer text interpretations of alphabetic symbols, such as "a" "b" or "c." Alphabetic characters may include any such characters readable by an application, and may not necessarily be limited to characters from the English alphabet, but may include characters from alphabets associated with any number of other written languages. Numeric characters may include, for example, characters generally recognized by those skilled in the art such as "1" "2" or "3."

The template for creating a character string provided at block 201 may comprise a series of at least two segments. A segment may be a series of any number of alpha-numeric characters or special characters, or any combination of both. A segment may also be a blank, or open, space designed to be populated at some time with a series of characters. Generally, the endpoints of a segment may be defined by virtue of being the first character in such a string, by a blank space or by a special character, series of special characters or by any combination of the foregoing. For example, in the character string http://www.AAAAA.com, a first segment may comprise the series of characters "http://," a second segment may comprise the series of characters "www." which is set off from another segment, such as "AAAAA". A third segment in this example may be ".com". This example is not intended to limit the definition of segments in this context, as they may be delineated in any fashion desired.

Figure 3:
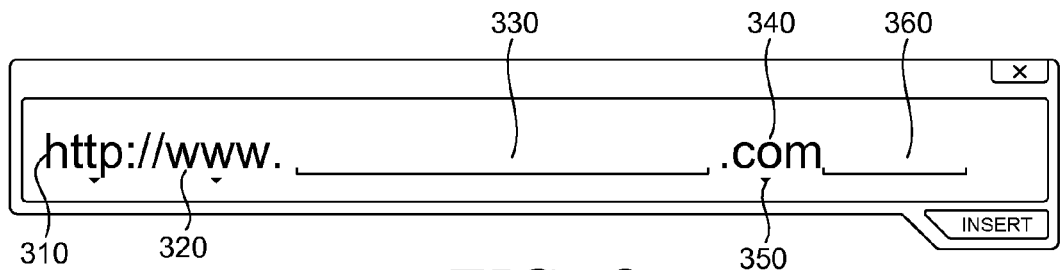
FIG. 3 is an illustrative screen display of an exemplary handwriting template provided to a user to receive handwriting input for a URL.

By way of example only and not of limitation, an exemplary URL template is illustrated in FIG. 3. The template generally comprises at least one open segment 330 for receiving handwriting input from a user. In some instances, the template may also include at least one additional open segment 360. Additionally, the template generally comprises at least one pre-populated text segment, three of which are shown in FIG. 3 at 310, 320 and 340. A pre-populated segment may be accompanied by a link 350 to a list of meaningful replacement candidates for the segment. Open segments 330 and 360 are initially provided unpopulated by any sort of character or symbol, and are configured such that the user may interact with the operating system to populate the open segment with one or more characters. An embodiment of the invention is directed toward configuring at least one open segment to be capable of receiving handwriting input.

As mentioned above, a template generally comprises at least one pre-populated segment, for example segment 310 in FIG. 3. A pre-populated segment may be populated with any number of a series of characters, and in a preferred embodiment, a portion of text. Generally, a pre-populated segment is populated with text or characters that represent a segment that is common or required in a particular type of character string.

For example, as shown in FIG. 3, in an embodiment of the invention, a template may be designed to help the user create a URL. A URL template may comprise a first segment 310, which is pre-populated, and which may be referred to as a protocol segment. A protocol segment may be populated with any number of known portions of text defining a protocol or in the case of a system browser, such as Windows Explorer, a drive letter. Examples of protocol segments include, for example, "http://", "https://", "ftp://", "//", "A:" or "file://". A URL template may consist of a second segment 320, which is pre-populated, and may be referred to as a sub-domain segment. A sub-domain segment may be populated with any number of known portions of text defining any number of various sub-domains, which will be readily appreciated by those skilled in the art. A sub-domain segment may be populated with portions of text including, for example, "www.", "mail." or "web.". In an embodiment, a URL template has a third segment 330, which is an open segment, operable to receive handwriting input, and a fourth segment 340, which is pre-populated with a text string that identifies what is known in the art as a domain name. For example, a fourth segment 340 of a URL template may be referred to as a top-level domain name segment, and may include, for example, portions of text such as ".com", ".net", ".org", ".edu", or ".gov". A URL template, as shown in FIG. 3, may also include a fifth segment 360 that is open for receiving handwriting input.

Figure 4:
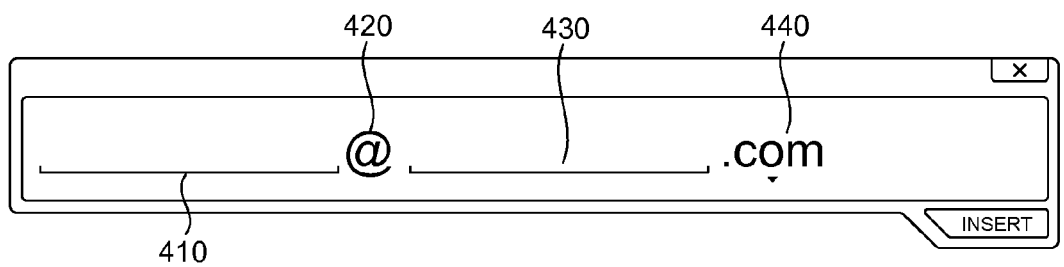
FIG. 4 is an illustrative screen display of an exemplary handwriting template provided to a user to receive handwriting input for an e-mail address.

As another example, a template may be designed to assist the user in creating an e-mail address. An exemplary illustration of an e-mail address template is shown in FIG. 4. An e-mail template may comprise, from left to right, a first open segment 410 for receiving handwriting input, the "@" symbol 420, a second open segment 430 for receiving handwriting input, and finally a top-level domain name segment 440. The top-level domain name segment 440 may be defined in a similar manner as discussed above regarding a URL template.

Figure 5:
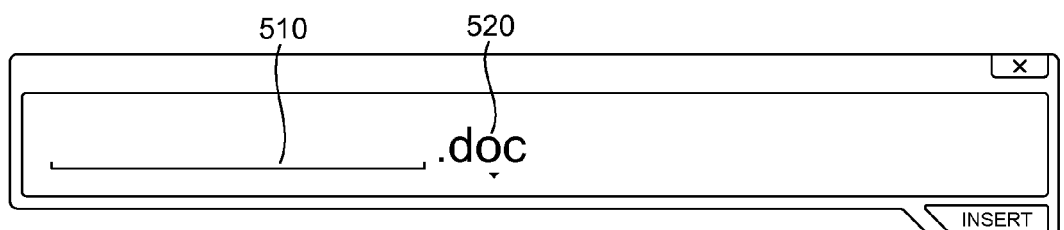
FIG. 5 is an illustrative screen display of an exemplary handwriting template provided to a user to receive handwriting input for a filename.

In a further example, a template may be provided to assist the user in creating a filename. As shown in FIG. 5, a filename template may consist, from left to right, of an open segment 510 for receiving handwriting input and a file extension 520, which is preferably a pre-populated segment. Filename templates may be used, for example, for inputting text into the "filename" text box in standard open and save file dialogs.

Figure 6:
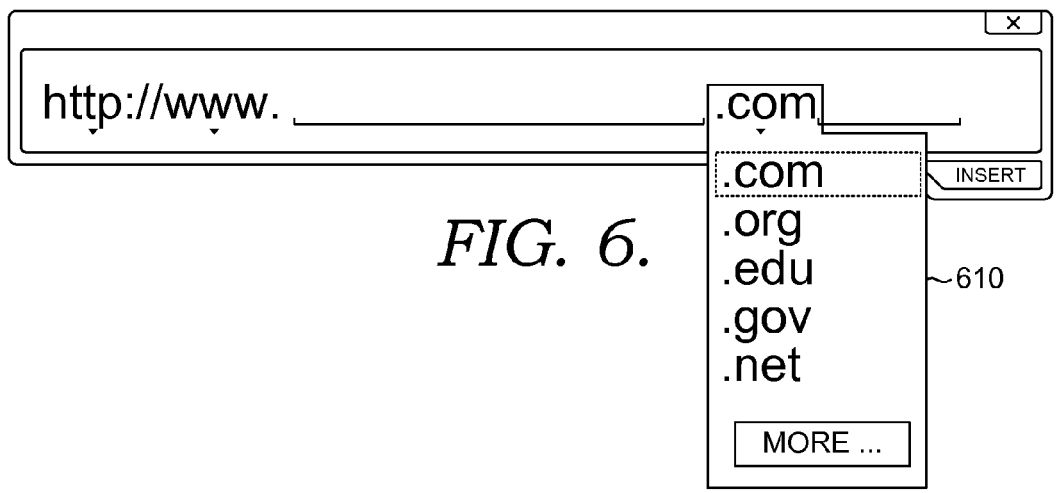
FIG. 6 is an illustrative screen display of an exemplary handwriting template wherein a user has opened a list of alternatives for a pre-populated segment.

In an embodiment, a pre-populated segment may include only one portion of text, that portion of text being unalterably fixed in the segment. In another embodiment, a pre-populated segment may contain a portion of text and be operable to substitute that portion of text with any number of other portions of text that may be appropriate for placement in that segment. Such other portions of text may, in an embodiment, be presented as meaningful replacement candidates and may be listed in a drop-down menu, a horizontal line menu, or any other user interface component operable to present to a user a set or list of alternatives. In one embodiment, meaningful replacement candidates for the pre-populated segment are presented in a drop-down menu which may appear when a user taps on the pre-populated segment with a handwriting device, clicks on the segment with a mouse, or sets focus on the segment using any other user input device. An example of a drop-down menu 610 in accordance with one embodiment of the invention is illustrated in FIG. 6.

In an embodiment, a drop-down menu that contains meaningful replacement candidates for a pre-populated segment in a handwriting template may be presented as a drop-down list. In a preferred embodiment, a drop-down list may function as a most frequently used list, or MFU list. Those skilled in the art will readily appreciate the functionality and appearance of MFU lists, and accordingly, MFU lists will not be described in unnecessary detail here. In an embodiment, the top entry in an MFU list may be the default entry, and may be the one that appears in the pre-populated segment. The MFU list will show the rest of the meaningful replacement candidates sorted by frequency of use, with the most frequently used items appearing higher in the list than items used less frequently. In various embodiments of the invention, the drop-down MFU list may also have an entry at the bottom of the list with a title such as "More . . . " and may be accompanied by a hierarchical file menu arrow. In other embodiments, the drop-down MFU list may have only a hierarchical file menu arrow or other similar symbol known in the art. Upon setting focus on this final entry or symbol, for example by clicking or tapping on it, a longer list may be displayed to the user and may contain additional meaningful replacement candidates for the pre-populated segment. In an embodiment, this longer list may be sorted according to MFU, and in which case may constitute an extension of the initially displayed MFU list. In other embodiments, the longer list may be sorted alphabetically or according to any number of other ordering schemes known in the art.

In an embodiment of the invention, a drop-down list providing meaningful replacement candidates may also be operable to receive handwriting input. It may from time to time be the case that such a list does not contain a replacement candidate that the user wishes to select, and the user may wish to input a portion of text to be used as a meaningful replacement candidate, in lieu of those provided in the drop-down list. The drop-down list may contain an entry that is operable to provide an open segment for receiving handwriting input in place of the pre-populated segment. A user may access the open segment by clicking on the appropriate list entry. In other embodiments, an open segment may be provided in place of the pre-populated segment when the user scratches out the portion of text in the pre-populated segment with a pen or other user input device. It will be readily appreciated that any number of other procedures may be operable to enable a user to substitute handwriting input for pre-populated text in segment. The portion of text that a user inputs may, in an embodiment, be captured by the system and added, for example, to the MFU list or other drop-down list as a permanent or temporary list entry, accessible to the user in the future. Such a new entry may also be capable of enjoying the functionality of the MFU list, wherein frequent use of the entry may cause the entry to appear higher in an MFU list than other entries used less frequently.

Referring again to FIG. 2, as shown in block 202, an open segment receives handwriting input from a user. As described above, any number of user input devices known in the art may be utilized to cause handwriting input to be transmitted to the user interface, and specifically to the open segment of the template. A user may perform this operation simply by starting to write in the open segment, which may expand automatically to accommodate the handwriting input for as long as the user continues to write. After the user ceases writing, the open segment will shrink back down to accommodate no more than the length of the input.

The open segment may be operable to suggest text automatically to the user as the user writes in the segment. This text suggestion operation will be readily appreciated by those skilled in the art. In embodiments, the text suggestion operation may be configured to display suggestions for the entire character string represented by the template or for one or more segments contained therein. Those skilled in the art will readily appreciate that there may be various reasons for configuring this operation various ways such as reasons related to an improved user experience, computational efficiency or any number of other concerns or objectives.

In an embodiment, for example, a character string template may be a URL template with an automatic text suggestion operation configured to display particular types of text suggestions based on some detectable state in the system. For example, an embodiment is directed to evaluating whether one of two particular situations has occurred, and based on the result of this evaluation, will return a certain portion of the character string. In this example, if the user has only written in the open segment between the sub-domain segment ("www.") and the top-level domain name segment (".com"), the system may display text suggestions only for the handwritten input. If the user has added text after the top-level domain name segment, however, the system may display suggestions for the entire character string. These suggestions, may be obtained from the user's browser history, and may include, for example, only the browser history entries that have the same protocol label as the protocol text selected or pre-populated in the first segment of the URL template.

In block 203, the handwriting input received from the user is converted into text. The conversion may be performed by any number of applications, modules or devices known in the art or similar to those known in the art. The text generated from the handwriting input may also be treated as segmented and may be divided, for efficient processing and error-correction, into segments. The division of inputted text into segments can be configured to adhere to any desired set of parameters.

For example, in an embodiment of the invention, handwriting input to a URL template may be divided into segments based on the location of the handwriting input within the template and the presence of certain special characters such as "." and "/". In an embodiment, for example, if the handwriting input is located between the sub-domain segment ("www.") and the top-level domain segment (".com"), any text generated from the handwriting input that ends with a "." may be a segment, and whatever is left over before the top-level domain segment may be a second segment. Thus, if the exemplary URL template as completed reads "www.download.server.com," the character string may be divided into the following segments: "www.", "download.", "server", and ".com". In this example, if text is inputted after the top-level domain name segment, text that ends with a "/" may be a segment, and whatever is left over after the last segment may also be a segment. In this example, the top-level domain name segment may be extended to include a "/" at the end if the user adds one after this segment. Thus, if the complete character string reads "www.server.com/money/index.html", it may be divided into the following segments: "www.", "server", ".com/", "money/", and "index.html".

After the handwriting input is converted to text, the converted text is combined in the template with the pre-populated segments and/or any other open segments that have received handwriting input subsequently converted to text. The combination of the at least one open segment, now populated with text as a result of handwriting input from the user, and the at least one pre-populated segment comprises the character string, which is displayed to the user in block 204. In addition to, or in lieu of, being displayed, the character string may be provided to the computing system or an application therein to be used by the system or application.

Figure 7:
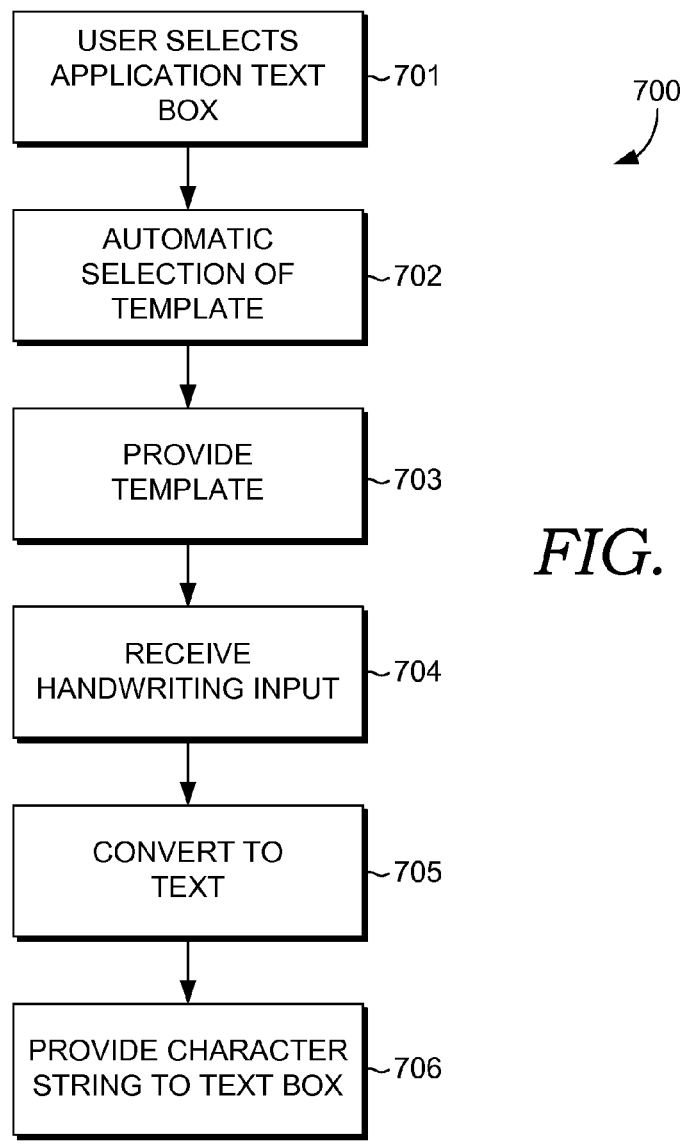
FIG. 7 is a flow diagram showing a method for automatically providing a character string template and using the same to create a character string in an application text box in accordance with an embodiment of the present invention.

Turning to FIG. 7, a flow diagram is provided that shows a method 700 for automatically providing an appropriate template in response to a user setting focus in an application text box. Initially, at block 701, a user sets focus in a text box, which may be associated with an application. As will be readily appreciated by those skilled in the art, a user may set focus in a text box in any number of ways, including, for example, by clicking on the text box with a mouse or tapping on a text box with a handwriting tool. A text box is a widely used and well-known element of a graphical user interface, also known in the art as a text field or text entry box. A text box allows a user to input text which can then be used by an application. Information generally is inputted to a text box by using a keyboard to type the text, but also may be inputted in any number of other ways, including by utilizing a handwriting input device, as contemplated by embodiments of the present invention.

In response to a user setting focus in a text box, a handwriting template is selected, as shown in block 702. In a preferred embodiment, an appropriate character string template is automatically selected based on the functionality of the particular text box selected. For example, if the user sets focus on the address bar of a web browser, a URL template will be automatically selected, or if the user sets focus on a text box operational to take an email address, such as a "To:" text box, an email template will be automatically selected. The selection is made by the application and is enabled by setting a window property or input scope for each text box for which a template is desired. Templates may be selected that correspond to any type of text box that is operable to receive a character string as input. Once an appropriate template has been selected for receiving handwriting input to the text box, the template is provided to the user, as in block 703.

The method of FIG. 7 proceeds from here as in the method of FIG. 2. The template receives handwriting input from the user, as shown in block 704, and converts the handwriting input to text in block 705. Finally, at block 706, the character string, comprising at least one pre-populated segment as described above and at least one open segment populated with text generated from handwriting input as described above, is provided to the text box that the user set focus in at block 701. The application can then use that character string in whatever manner is appropriate, including simply displaying it, as in block 204 of FIG. 2.

The method 700 of FIG. 7 may also be operable to allow correction of character string text within a template after handwriting input has been received. A user may explicitly select parts of or the whole text in the text box, rather than setting focus on the text box itself. In response to a user selecting specific text in a text box enabled to provide templates, a template will be provided that is populated with the text that has been selected. Additionally, in an embodiment of the invention, if the selected text can be detected and identified as a certain type of character string, a template appropriate to that character string will be provided, populated with the selected text, as well as with the appropriate pre-populated text segments. For example, if the selected text is determined to be a URL, a URL template will be displayed; if the selected text is determined to be an e-mail address, an e-mail template will be provided; and if the selected text is determined to be a filename, a filename template will be provided.

Figure 8A:
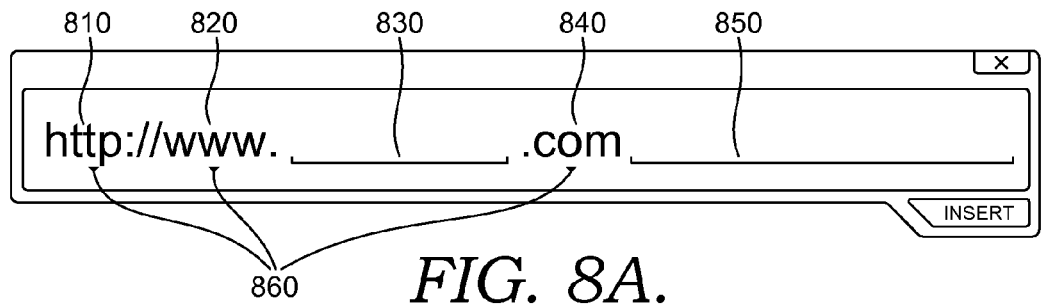
FIG. 8A is an illustrative screen display of an exemplary handwriting template provided to a user to receive handwriting input.
Figure 8B:
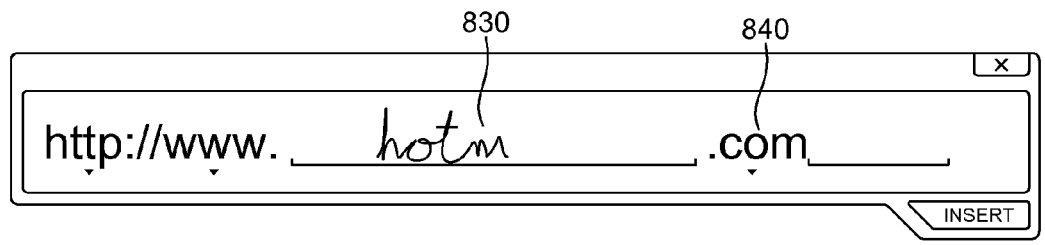
FIG. 8B is an illustrative screen display of an exemplary handwriting template wherein the user has begun writing in an open segment.
Figure 8C:
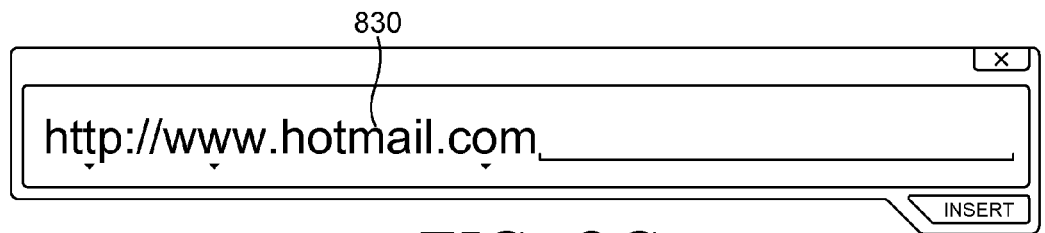
FIG. 8C is an illustrative screen display of an exemplary handwriting template in which handwriting input has been converted to text to generate a character string.

Turning now to FIG. 8A-8C, illustrative screen displays of an exemplary URL template are shown. In this example, as shown in FIG. 8A, a URL template is provided (e.g., when the user sets focus in the address bar of a web browser). The exemplary template shown in FIG. 8A comprises, from left to right, a protocol segment 810, "http://", a sub-domain segment 820, "www.", an open segment 830 for receiving handwriting input "\_\_\_\_\_", a top-level domain name segment 840, ".com", and a second open segment 850 for receiving handwriting input, "\_\_\_\_\_". Additionally, arrow buttons 860 appear below each of the pre-populated segments, and if the user sets focus on an arrow 860, a drop-down list, as described above and as shown in FIG. 6, may appear below the segment to offer meaningful replacement candidates for the pre-populated segment.

In FIG. 8B, the user begins writing in the URL template. As discussed above, the open segment 830 will expand, causing the top-level domain name segment 840 ("com") to slide to the right, if the user needs more writing space. In FIG. 8C, the handwriting input has been converted to text and the open segment 830 has shrunk to accommodate only the size of the converted text. In an embodiment, if a user now performs a scratch-out on the template, the text generated from the handwriting input will be removed, leaving the URL template as originally provided and as shown in FIG. 8A.

As can be understood, embodiments of the present invention provide methods for using templates to assist users in creating character strings that may be used or displayed by an application, or for any other purpose desired. Further embodiments of the present invention provide automatically selecting and providing character string templates for generating character strings for use or display by applications and automatically determining the nature of selected portions of text in order to provide an appropriate template for the selected text.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media embodying computer-useable instructions for performing a method for using a template to facilitate processing non-prose handwriting input from a user, the method comprising:
   providing a template for creating a character string, the template including at least one open segment for receiving handwriting input and at least one pre-populated text segment;
   receiving handwriting input in the at least one open segment;
   converting the handwriting input to text to generate the character string from the template including both the at least one pre-populated text segment and the at least one open segment, the character string including an uninterrupted series of characters of the at least one pre-populated text segment and the text; and
   displaying the character string.

2. The media of claim 1, wherein the character string comprises at least one of a uniform resource locator (URL), an e-mail address, and a filename.

3. The media of claim 1, further comprising providing the character string to an application, wherein the application uses the character string.

4. The media of claim 1, wherein the at least one pre-populated text segment comprises a list of meaningful replacement candidates.

5. The media of claim 1, wherein providing a template comprises providing a template in an area selected by a user.

6. The media of claim 1, wherein the at least one open segment grows automatically to accommodate the handwriting input.

7. One or more computer-storage media embodying computer-useable instructions for performing a method for using a template to facilitate processing non-prose handwriting input from a user, the method comprising:
   automatically selecting at least one template for receiving handwriting input in response to a user setting focus on an application text box, the template including at least one open segment for receiving handwriting input and at least one pre-populated text segment;
   automatically providing the at least one template;
   receiving handwriting input in the at least one open segment;
   converting the handwriting input to text to generate a character string from the template, the character string including an uninterrupted series of characters of the at least one pre-populated text segment and the text; and
   providing the character string to the application text box.

8. The media of claim 7, wherein automatically selecting the at least one template comprises:
   determining a type of the application text box; and
   selecting the at least one template based on the type of the application text box.

9. The media of claim 7, wherein the at least one template is automatically selected based on user-selected text, and the at least one template is pre-populated with at least a portion of the user-selected text.

10. The media of claim 9, further comprising determining whether the user-selected text comprises an e-mail address.

11. The media of claim 10, wherein if the user-selected text comprises an email address, selecting a template for generating an e-mail address.

12. The media of claim 9, further comprising determining whether the user-selected text comprises a uniform resource locator (URL).

13. The media of claim 12, wherein if the user-selected text comprises a uniform resource locator, selecting a template for generating a URL.

14. An apparatus, comprising:
   a computing system having a display;
   wherein said computing system is operable to provide at least one template for creating a character string, the at least one template comprising at least one pre-populated text segment and at least one open segment for receiving handwriting input;
   receive handwriting input into the at least one open segment;
   convert the handwriting input to text to generate a character string from the template including both the at least one pre-populated text segment and the at least one open segment, the character string including the text and the at least one pre-populated text segment; and
   display the character string.

15. The apparatus of claim 14, wherein the character string comprises an uninterrupted series of at least two characters.

16. The apparatus of claim 15, wherein the at least two characters comprises at least one alpha-numeric character.

17. The apparatus of claim 15, wherein the at least two characters comprises at least one character that is not alpha-numeric.

18. The apparatus of claim 14, wherein the at least one pre-populated text segment comprises a list of meaningful replacement candidates.

19. The apparatus of claim 18, wherein the list of meaningful replacement candidates is operable to receive additional alternatives as input from a user.

20. The apparatus of claim 18, wherein the list of meaningful replacement candidates comprises at least one of a simple flat list or a complex list.

* * * * *